United States Patent [19]

Davis

[11] 4,249,577
[45] Feb. 10, 1981

[54] PROCESS AND APPARATUS FOR SEALING GAS LINES

[76] Inventor: James W. Davis, 2013 Walker, Amarillo, Tex. 79107

[21] Appl. No.: 74,242

[22] Filed: Sep. 10, 1979

[51] Int. Cl.³ .............................................. F16L 55/10
[52] U.S. Cl. ...................................... 138/92; 138/97
[58] Field of Search ................. 138/92, 97, 98, 99, 138/94, 89; 137/15, 315

[56] References Cited

U.S. PATENT DOCUMENTS

| 3,674,055 | 7/1972 | Ray | 138/92 |
| 3,785,291 | 1/1974 | Bergbauer et al. | 138/97 |
| 3,948,282 | 4/1976 | Yano | 137/15 |
| 4,153,067 | 5/1979 | Ray | 138/92 |

Primary Examiner—Lenard A. Footland
Attorney, Agent, or Firm—Ely Silverman

[57] ABSTRACT

A safe, easy and fast procedure and apparatus for sealing by welded steel plugs branch lines connected to conduits through which gas is flowing, uses a low-carbon steel plug which does not develop cracks on cooling from welding temperature; such plug is arranged to carry a resilient sealing and holding element for locating such plug in place in a cut branch line during welding as well as providing a seal against gas passage during welding. A hard metal die element is provided to properly enlarge and form the cut branch line to accept the plug and resilient sealing and holding element.

8 Claims, 16 Drawing Figures

U.S. Patent  Feb. 10, 1981  Sheet 1 of 5  4,249,577
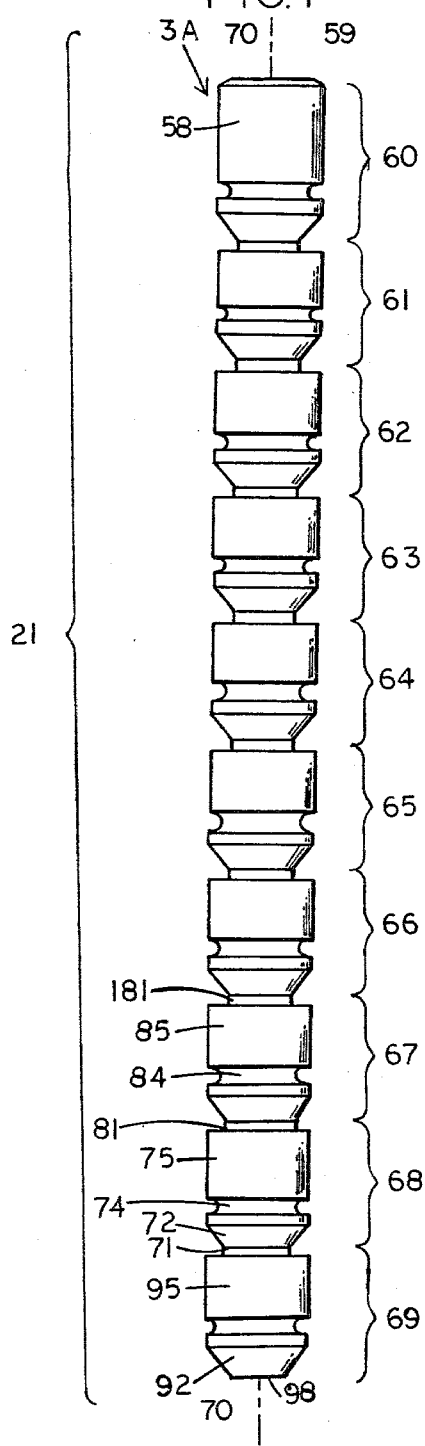
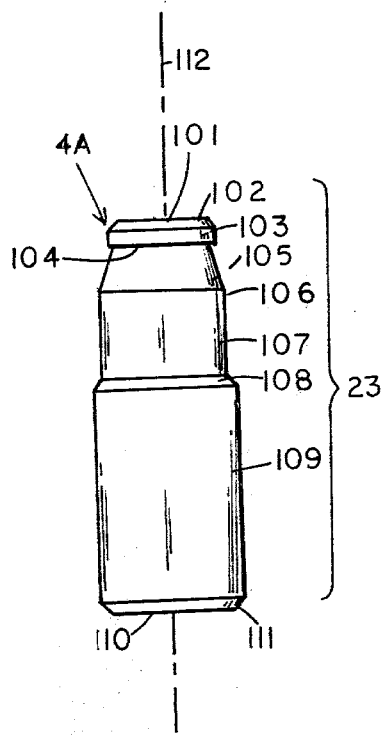

PROCESS AND APPARATUS FOR SEALING GAS LINES

BACKGROUND OF THE INVENTION

1. The Field of the Invention

The field of art to which this invention relates is pipes and tubular conduits with closures and plugs, laterally insertable.

2. Description of the Prior Art

Standard practice in the cutting off of gas service lines connected to the main line through a tee is to apply a steel closure plate to the cut-off tee and, while main line gas pressure is applied to the bottom of such closure plate, to weld the closure plate to the cut tee to form a seal thereon. This results in frequent escape of gas during the procedure of welding and development of a flame that harms welding operators, as well as development of cracks in such metal seal due to rapid cooling of such metal seals, which requires repeated testing for gas leaks and requires added welding steps, as does the development of holes through such initial welds by the line gas under pressure being applied to the zone of welding during welding.

SUMMARY OF THE INVENTION

By the steps and apparatus of this invention, a plug unit which serves as the component of the final sealing element in a sealed-off tee is first located in the tee to be sealed off and held there by a resilient seal without flow of gas to the zone of welding and without concurrent escape of gas past the to-be sealed orifice to a heated zone where combustion thereof readily occurs. The seal serves the double purposes of:

(i) preventing the gas from escaping from the line outward to the zone of welding while the operator is forming a bead and, (ii) firmly holding the plug in position so that the plug will not move during the welding operation, notwithstanding application of high pressure gas to the plug upper surface during such operation and varied line pressure to the plug lower end.

The metal used as plug is chosen to not develop cracks during the rapid cooling to which such plug is subjected. Inasmuch as the sealing and holding element has an initially greater outer diameter than the initial interior diameter of the tee, the tee is timely enlarged by a special tool to accept the plug sealing and holding element.

BRIEF DESCRIPTION OF THE DRAWINGS

FIG. 1 is a side view, drawn to scale, of a plug assembly 21.

FIG. 2 is a side view, drawn to scale, of the die unit 23.

FIG. 6 is a diametric vertical sectional view along branch line pipe 32 prior to initiation of the operations according to this invention and showing the pipe-related parts in their normal operative position prior to initiation of the operations of this invention.

FIG. 7 illustrates the first stage in the sequence of operations according to the overall process of this invention.

FIG. 8 illustrates a stage which is subsequent to that stage shown in FIG. 7 and wherein a temporary plug assembly 40 is located in the upstanding pipe 32.

FIG. 9 illustrates structures developed in a stage subsequent to the stage shown in FIG. 8 and following a cutting operation.

FIG. 10 illustrates the condition of the cut pipe portion and related parts after the removal of the temporary plug shown in FIG. 9.

FIG. 11 illustrates the initial position of the die 23 of FIG. 2 within the structure shown in FIG. 10.

FIG. 12 illustrates the position of parts in the step of operation following the position of parts shown in FIG. 11.

FIG. 13 shows the position of parts at a step subsequent to the position of parts shown in FIG. 12, following removal of the die 23, and prior to insertion of assembly 21.

FIGS. 11, 12 and 13 are drawn to scale.

FIG. 14 illustrates the position of parts following the insertion of the permanent plug unit assembly into the formed structure shown in FIG. 13 as 33.

FIG. 15 shows the position of parts and structures resulting from welding the formed tube 33 of FIG. 13 to the plug unit 68 shown in FIG. 14.

FIG. 16 shows a plug unit 68 in place after cutting off that particular plug unit from the remainder of the multiple permanent plug unit assembly of FIG. 15.

FIGS. 11 and 12 are composite views of die 23, being taken partially as side views of die 23 and partially as longitudinal diametric section views through the longitudinal axis 112 of die 23.

Figure 3:
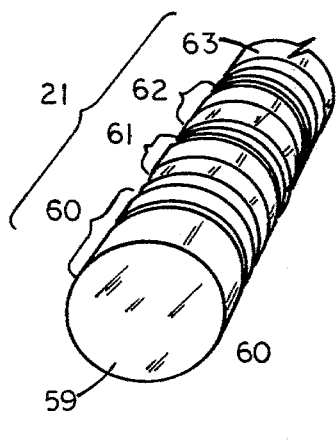
FIG. 3 is a perspective view, looking along the direction of arrow 3A of FIG. 1, of the plug assembly 21.
Figure 4:
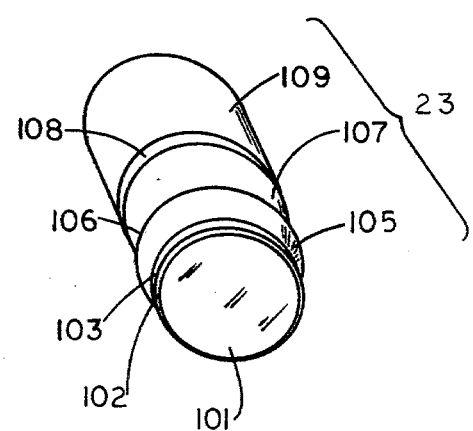
FIG. 4 is a perspective view, looking along the direction of arrow 4A of FIG. 2, of the die unit 23.

Dimensions of a preferred embodiment of apparatus 21 and 23 are set out in Table I and compositions thereof are set out in Table II.

DESCRIPTION OF THE PREFERRED EMBODIMENT

The apparatus according to this invention comprises a multiple permanent plug unit assembly 21 which is used in combination with a die unit 23, a temporary plug unit 40 and a welding apparatus 80.

Figure 5:
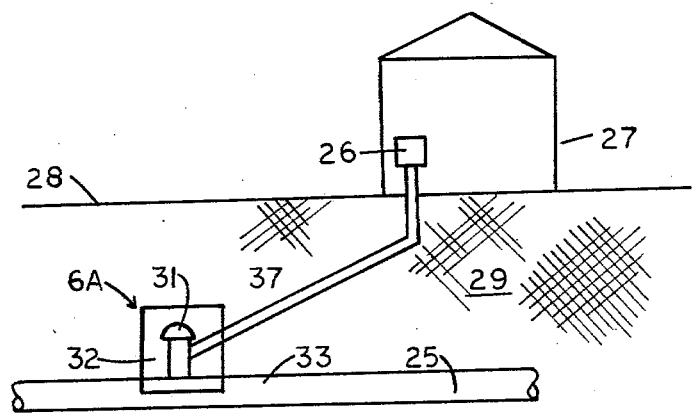
FIG. 5 is a diagramatic view of the present area of use of the apparatus and process of this invention.
Figure 16:
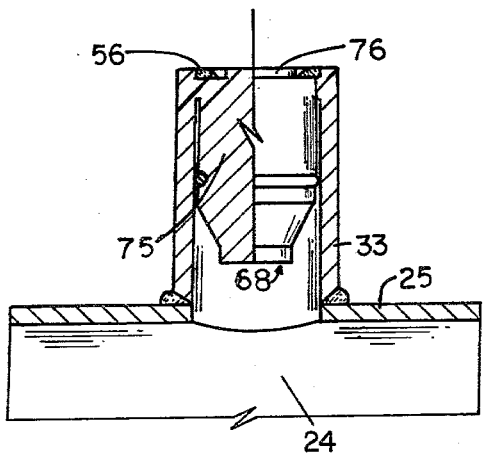

The purpose of operation of this process and of the tools 21 and 23 of FIGS. 1 and 2 is the safe, fast and easy removal of branch lines as 37 from tees as 32 as shown in FIG. 5 and plugging of the tee as shown in FIG. 16.

The multiple permanent plug unit assembly 21 comprises a series of like permanent plug units 60–69 firmly joined together.

Figure 14:
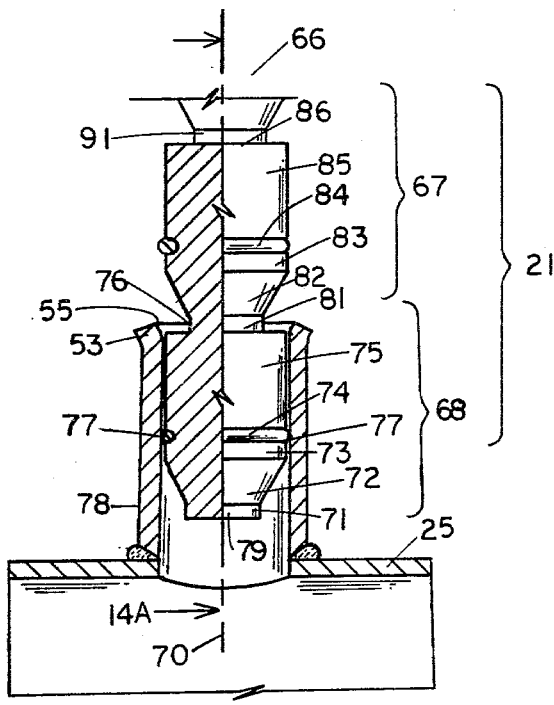
Figure 15:
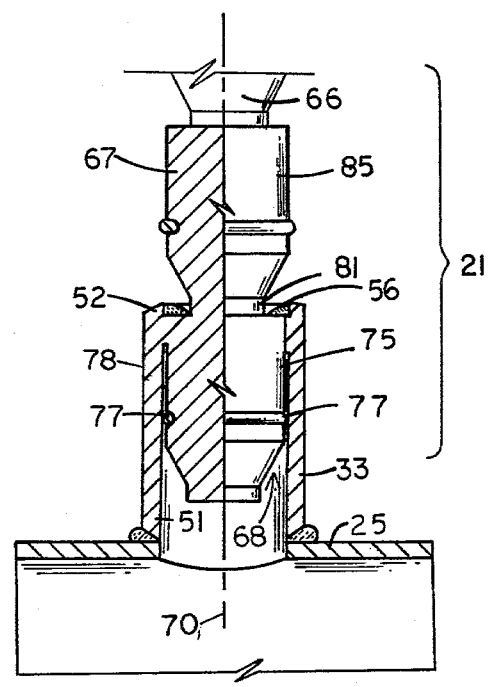

Each of the plug units 61–68 is identical and each of plug units 60–69 is the same, except for the below described details of the top-most unit 60 and the bottom unit 69. Accordingly, except as below described, the description of the plug unit 68 applies to all the like units 61–68 and, also, to terminal upper units 60 and terminal lower unit 69 of assembly 21. Each permanent plug unit as 68 is an axially symmetrical rigid structure, circular in crossection transverse to its axis of symmetry, axis 70. The axis 70 is shown in FIGS. 1, 14 and 15. FIGS. 14 and 15 are shown partially as longitudinal crossection views, such views passing through the axis 70. From bottom to top thereof, as shown in FIGS. 1 and 14, each permanent plug unit as 68 has a lower permanent plug unit interunit cylindrical portion 71, and, firmly connected thereto, a permanent plug unit frusto-conical portion 72, and, thereabove and firmly connected thereto, a cylindrical permanent plug body lower portion 73 which is continuous with an annular plug body groove 74 and, thereabove, a cylindrical permanent plug body upper portion 75, the cylindrical portion 75 terminating in a permanent plug unit upper shoulder surface 76.

The diameters of the lower and upper body portions 73 and 75 are the same size. Portions 71–76 are co-axial.

Figure 13:
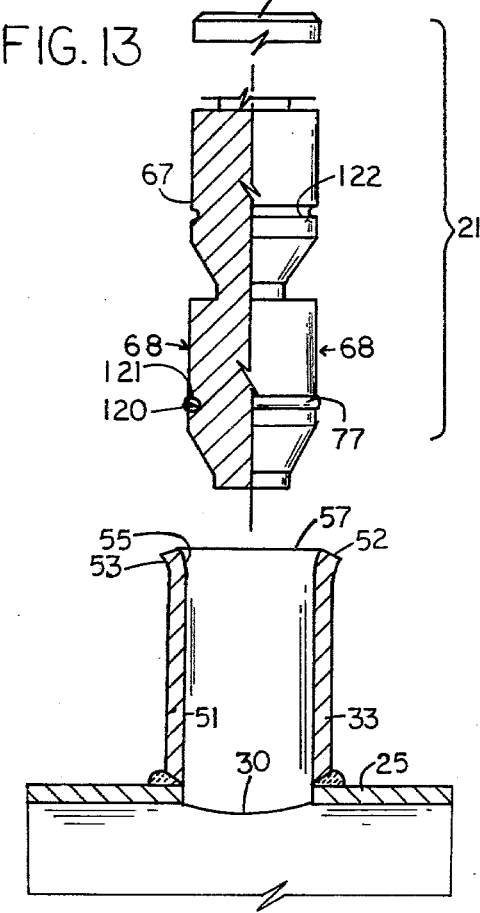

A resilient anchor ring 77 is applied to and held in the circular ring groove 74 during operation as shown in FIGS. 13, 14, and 15. The thickness of the groove 74, measured from its central or inner edge 122 to its outer edge joining the cylindrical surfaces of portions 73 and 75 is less than the thickness, measured from ring outer edge 120 to ring central edge 121, shown in FIG. 13, of resilient anchor ring 77. The length of groove 74, parallel to axis 70, is greater than the width of ring 77 (measured parallel to axis 70).

Each permanent plug shoulder surface, as 76 of unit 68, is a flat annulus and is connected through a permanent plug assembly interunit connector, as 81, to the plug unit 67 above such first plug unit 68; the plug unit 67 has a permanent plug connector 91 corresponding to the interunit connector 81, a frusto-conical portion 82 corresponding to portion 72 of unit 68, a cylindrical permanent plug body lower portion 83 corresponding to portion 73 of unit 68, a groove 84 corresponding to groove 74 of unit 68, a body portion 85 corresponding to body portion 75 of unit 68, a flat shoulder surface 86 corresponding to the surface 76 of unit 68. An interconnecting unit 91 like 81 connects the plug unit 67 to the plug unit 66 above unit 67.

The lower-most plug unit 69 has the same structures as does each of upper plug units 67 and 68 except that the lower-most plug unit 69 does not have, below frusto-conical portion 92 thereof, an interconnecting unit as 71 or 81: the unit 69 terminates at its lower end 98 at the bottom of the frusto-conical portion 92 of plug unit 69.

The material composing the units 60–69 is a "soft" composition steel, as ASA 1018 or 1020 steel, a low carbon steel, also known as mild steel. As below described in detail, such steel is chosen to avoid the development of martensite and to avoid cracking during cooling following welding operations.

Top plug unit 60 is identical with the unit 68 except that its permanent plug upper body portion 58 is somewhat longer than the corresponding upper plug body 75 in unit 68.

The die unit 23 is a rigid structure composed of a tough, hard, high carbon steel and is cylindrical in section and axially symmetrical.

Figure 12:
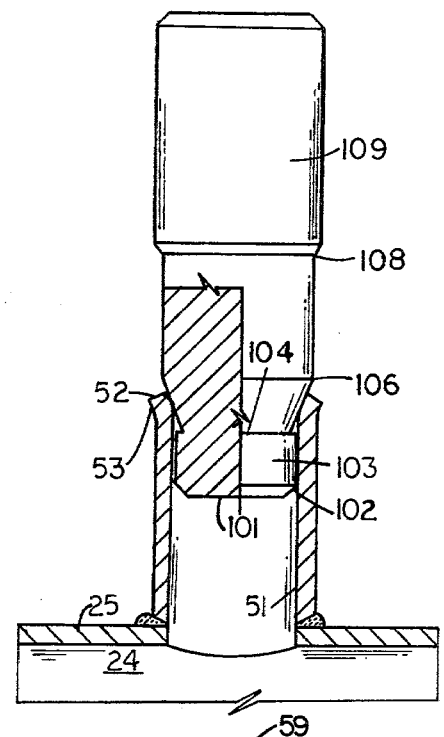
Figure 11:
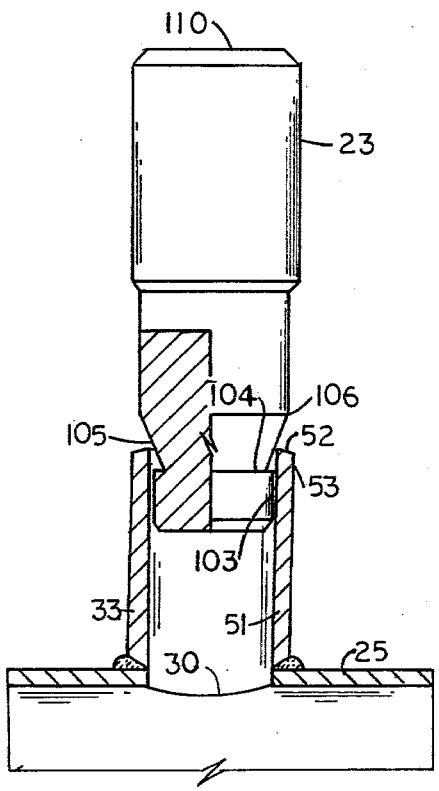

The die unit 23 is composed of a narrow, flat, circular end face 101 which is beveled on its outer edge and is continuous with a die unit small end cylindrical portion 103. The cylindrical end portion 103 is connected by a flat annular surface, 104, inwardly directed from the outer surface of the cylindrical portion 103 to die unit frusto-conical portion 105. The frusto-conical portion 105 is connected by an intermediate frusto-conical cylindrical portion junction edge 106 to an intermediate cylindrical body portion 107: a frusto-conical shoulder portion 108 extends outward from the cylindrical portion 107 and is continuous with an upper cylindrical portion 109 which is terminated at the die upper end 110 through a die unit upper frusto-conical beveled end portion 111, all as shown in FIGS. 2, 11, and 12.

The material of which the die 23 is composed is an extremely hard as well as tough steel such as SAE 4140 (having the composition given in Table II) which not only has a high surface hardness but also is extremely tough and may absorb hammering applied thereto and transmit such hammering stress from the upper end 110 to its frusto-conical surface 105 as below described.

In the conventional pipe line distribution system a main pipe line 25 under the surface 28 of the ground and located in a volume of ground 29 is connected to many vertically extending tees as 32, each of which is provided with a cap as 31 and a branch or service line 37; each line, as 37, extends from a tee as 32 to a meter 26 attached to a structure such as a house 27 to which the gas from the line 25 is sent. Service line 37 is a gas-tight metal pipe or tube.

The line 37 enters tee 32 by an opening 38 in the wall of the vertically extending branch line or tee.

The lower edge, 39, of the opening 38 is spaced from the top of the pipe 25 by a length of pipe 33; pipe 33 is usually about 2½ inches long (6.35 cm).

Figure 7:
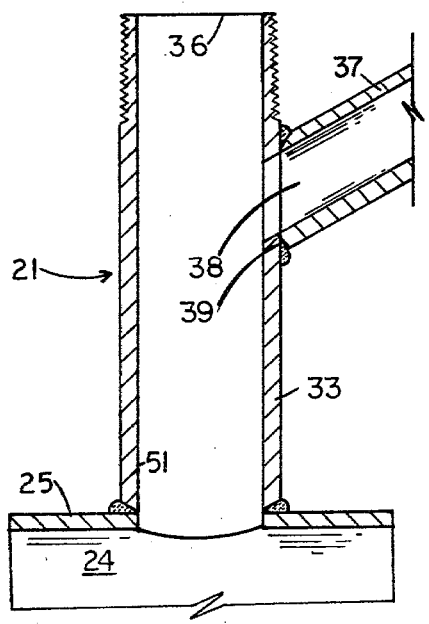

To disconnect line 37 from 25 and seal off the tee 32 the cap 31 is unscrewed from the threaded portion 35 of the vertical pipe 32. Removal of the cap 31 leaves the interior 24 of the line 25 in direct communication with the opening 36 at the top of the tee pipe or branch line 32 as shown in FIG. 7.

Figure 8:
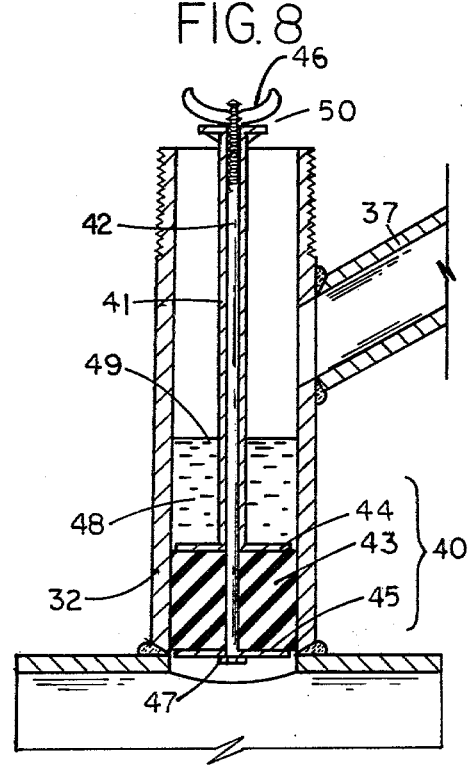

A temporary, expansible plug unit 43 is then moved through opening 36 in the pipe 32 at a position between the bottom edge 39 of the inlet of branch line 37 and the top of the pipe 25 generally as shown in FIG. 8. The temporary plug unit 43 is a portion of a temporary expansible plug assembly 40, which assembly 40 comprises a rigid vertical tube 41 which is attached to an upper rigid horizontally extending upper compressor plate 44; a rigid vertical shaft 42 which is threaded at its top and slidably located within tube 41 and is firmly attached to a horizontally extending rigid lower compressor plate 45, and an expansible gas-tight plug unit 43 located between plates 44 and 45. Shaft 42 is firmly held to plate 45 by a nut 47 fixed to shaft 42. In their vertically expanded, laterally contracted, non-stressed condition the plug 43 and plug plates 45 and 44 form a loose fit with the inner surface 51 of the wall of the pipe 32. A threaded wing nut 46 is firmly attached to a threaded portion at the top of shaft 42 and bears against the top of a rigid smooth-faced washer or pressure plate 50 which rests on tube 41. Tightening nut 46 against the washer or pressure plate 50, by turning on the threads on the top end of shaft 42, causes the bottom plug plate 45 to move towards the top plug plate 44 and compress the expansible plug 43 and cause it to expand laterally and make a gas-tight fit with the shaft 42 as well as with the inner surface 51 of the branch line (or tee pipe) 32.

Figure 9:
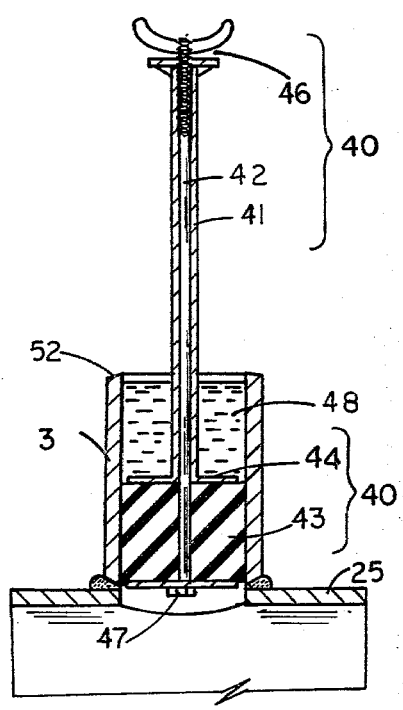
Figure 10:
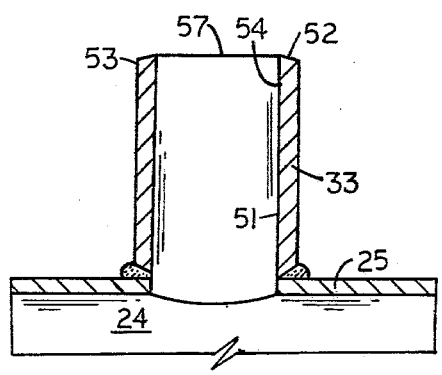

Water is then added to form a body of water 48 which extends from the top of the top plate 44 to slightly below the bottom edge 39 of the hole 38 in the tee line pipe wall. A cut is then made below the level of the hole 39 and the portion of the tee line pipe 32 thereabove is removed as shown in FIG. 9. Such cutting forms a cut edge 52 which is substantially frusto-conical in shape and has a smooth upwardly and radially facing surface. The cutting is done with an oxyacetylene torch.

The water 48 serves to prevent charring of the expansible rubber plug 43 which is only an inch or two removed from the position of the cutting flame which forms edge 52.

After such cutting the wing nut 46 is loosened and the expansible plug contracts in the horizontal direction and loses its sealing contact with wall 51 and expands vertically; the temporary plug assembly is then lifted and removed from the remaining lower portion 33 of tee pipe 32.

Removal of the temporary plug assembly 40 leaves a new circular, upwardly directed opening 57 surrounded by the cut edge 52. Such opening 57 is open to the interior 24 of the line 25 until--usually within two seconds--plugged by the die 23. The die 23 is placed with the downwardly narrowed frusto-conical portion 105 thereof in sealing contact with the interior cylindrical surface 54, at the upper edge of cylindrical surface 51, of pipe portion 33; i.e. die frusto-conical portion 105 is oriented with its narrower end directed downwardly. Such surface 105 forms a close fit with the newly cut opening 57 in portion 33 of tee pipe (or branch line) 32. The small end cylindrical portion 103 of the die 23 forms a smooth sliding fit with the wall 51 of the tee pipe wall portion 33 and serves to maintain the co-axial alignment of die 23 and the cylindrical interior surface 51 of the pipe 33 during hammering on the die 23. Hammering on the upper face 110 of the die 23 causes an outward deformation of the upper inner surface portion 54 of the tee line 33. This deformation is continued for a lateral radial deformation of about five thousandths of an inch: during the production of this deformed surface, shown as 55 in FIG. 13, the gas is blocked from passage through the newly cut opening, 57, from the main conduit or line 24.

Prior to the completion of the deformation the multiple permanent plug unit assembly 21 has attached thereto a ring as 77 made of resilient rubber. Such ring is a resilient toroidal solid formed by rotating a circle having a diameter (120-121 in FIG. 13) around a line--the axis of symmetry 70--that lies in the plane of such circle but does not intersect the circle. Such ring has, at 120, a greater external diameter than the internal diameter of the surface 51 of the pipe 33. However the cross section of element 77 is circular and is locatable within the outline of opening 57 at the upper end of surface 55. That upper end has a larger internal diameter than the surface 51 because of the stretching applied to that surface by the die 23 by the above described hammering action on the die 23 when located, as in FIG. 12, in the opening 57 of portion 33 of branch line or tee pipe 32.

By hammering, as with a 2 pound hammer, on upper end 59 of multiple plug assembly 21 the ring 77 forced is downward within the pipe 33 as the assembly 21 is moved downward, and plug 68 moves from the position shown in FIG. 13 to the position shown in FIG. 14 until
(a) the shoulder surface 56 is moved below the opening 57 and
(b) connector 71 and bottom of plug frusto-conical portion 72 are both above the opening 30 (from mainline 25 to pipe portion 33) generally as shown in FIG. 14.

But for the radial deformation of surface 55 to a generally frusto-conical form from the cylindrical form of surface 51, the resilient sealing ring 77 would not fit within the cylindrical surface 51. Such fit is, however, necessary in order for the sealing to be perfected between a permanent plug unit as 68, seal ring 77, and the wall 51 during the welding operation which follows.

Each plug unit as 68 is located with its shoulder surface, as 76, about ⅛ to 3/16 inch below the bottom edge of pipe opening, as 57, in which such plug unit is located.

This location of the unit 68 within the tube 33 provides for a gas-tight seal between the volume 24 within the pipe 25 and the opening 57.

The operator then applies a welding bead 56 at the junction of the shoulder surface 76 and the upper deformed internal pipe surface 55. Such heating of this junction and forming of the bead provides that the thin pipe 33 returns from its outwardly deformed position (shown as 53 in FIG. 14) to an outer wall surface contour which is cylindrical and of same size as the outer surface 78 of the pipe 33. This puts the welded bead 56 in a compressed condition between the inner surface of the pipe 33 adjacent to the opening 57 and the plug shoulder surface 76.

Following this attachment of the surface upper shoulder 76 and of the body 75 of unit 68 to the wall 33 a welding cut is made in a plane perpendicular to the axis 70 through the permanent plug inter unit connector 81 between the shoulder surface 76 and the frusto-conical portion 82 of the plug unit 67 therebetween. The portion of the multiple permanent plug unit assembly above the cut is then removed, leaving the permanent plug unit 68 firmly in place in the pipe 33 with the shoulder surface 76 slightly below the opening 57 and the lower end 79 of plug 68 above the opening 30 as in FIG. 16. The welding step used in the formation of the bead 56 and the rapid cooling of the body of each plug, as plug unit 68, does not develop any cracks in any such plug unit due to martensite formation because the composition of the unit 68 is a very low carbon steel, i.e. well below 0.25% C, although rapid quenching thereof occurs by air cooling of only a small length and diameter (1 inch diameter in this particular case) plug as 68. The plastic neoprene or rubber ring 77 is destroyed by the high temperature of the welding operation, which is effected close to that anchor ring 77, the ring 77 decomposing at about 500° Fahrenheit and welding temperature being at about 2,500° Fahrenheit, but the welding operation is completed prior to such destruction.

Because the portions of the assembly 21, as 67, above and connected to each plug unit, as 68, acted upon during the welding operation to produce the bead 56 of FIG. 15 prior to cutting the interconnecting unit, as 81, serve as a heat sump, such delay of heat transfer to the ring 77 permits that ring to act as a gas-tight seal until the welding operation is completed.

The die 23 may be released from its swaged connection to the frusto-conically formed surface 55 by striking the die portion 109 in a direction transverse to the longitudinal axis 112 thereof; because of its stiffness as well as its hardness and strength the die is readily loosened from the portion of pipe 33 that had been formed by such die. The die can also be tapped on its upper shoulder 108 to loosen it, it then being struck in the direction principally paralled to the longitudinal axis 112 and only secondarily at an angle thereto.

Figure 6:
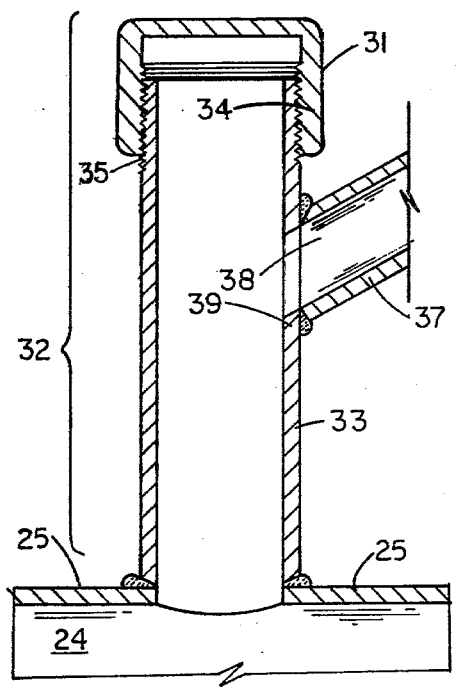
FIGS. 6-16 are vertical axial diametric sectional views in zone 6A of FIG. 5 illustrating the positions of parts during operations on and by the apparatuses of this invention.

The entire time for operation of the process above disclosed from the removal of cap 31 from its position as in FIG. 6 through temporary sealing as in FIG. 8, cutting, flaring, adding plug assembly 21 and anchor ring, welding of plug unit and cutting of plug unit assembly of which stages are shown in FIGS. 8-16 is safely completed in 5 minutes as compared with the prior usual procedure of 30–60 minutes with risk of gas escape and production of gas flame in neighborhood of the welder.

Bead 56 and the weld between top of unit 75 and surface 55 is prepared and completed by a welding operator of usual skill in 30 seconds by a shielded metal arc welding operation using an E-6010 type welding rod (a direct current reverse polarity rod as defined by American Welding Society) with a Lincoln 200 ampere welding machine and reverse polarity.

While the (Neoprene ®) rubber also known as polychloroprene, of which anchor ring 77 is composed, is high in heat resistance relative to natural rubbers, it still decomposes well at arc welding temperature, such decomposition occurs in this process only after the weld between the plug 68 and pipe portion 33 and the gas-tight metal seal formed thereby is completed because of (i) the distance between surface 76 and groove 74 between the readily decomposed organic resilient seal and the zone of welding, with temperatures above 2,500° F., and (ii) the speed of forming the bead 56 and seal between the wall portion 33 and plug body 75; silicone rubbers could also be used for ring 77, as they have higher melting temperatures than natural rubber, and that (iii) the portion of the plug unit assembly 21 above each one plug unit, as 68, as well as the plug body upper portion 75 above the plug body groove 74 of that one plug unit as 68, acts as a heat sump to protect the readily decomposed organic resilient seal 77 against the temperature and heat input provided to that unit during formation of the gas-tight bead and seal 56. The portion of the plug unit assembly 21 above each plug unit as 68 includes the plug unit 68, which is connected thermally as well as firmly, mechanically, to the unit 68 by the inter-unit connector 81; the plug unit 66 is similarly mechanically and thermally connected to unit 67 by the inter-unit connector 91. The temperatures of the welding arc used to form the bead 65 exceeds 2,500° F. (steel melting point) while the resilient soft rubber seal as 77—whether made of natural rubber, neoprene or silicone rubber—is destroyed at 500° F.–1000° F. as well as losing its mechanical strength at only about 400° F.

The time interval for placing and locating the plug unit 43 as shown in FIG. 8 prior to adding the water as there shown and following the position of parts shown in FIG. 7 is a brief interval, usually 2 to 5 seconds. The pressure in main line as 25 ranges from 8 oz. to 35 pounds per square inch gauge.

Table I sets out the dimensions of plug assembly 21 for use with 1¼ inch pipe type 80XS for the tee 32.

For other sizes of such pipe 32, as standard 1¼ inch size, the diameter of body 75 of plug units as 67 would be 1.375 inches ±0.005 inches and the relations of the exterior diameter of the plug body, as 75 of each plug unit, as 68, to the interior diameter of the tee line pipe, as 32 with which used, would be the same as for the die 23, plug 21, and tee line 32 above described.

TABLE I

DIMENSIONS OF APPARATUS

| | |
|---|---|
| Die 23 | |
| Overall Length (faces 101 to 110) | 4⅞" |
| Diameter body 109 | 1.735" |
| Length body 107 (from junction 106 to narrow portion of 108) | 1.25" |
| Diameter 107 | 1.522 |
| Frusto-Conical portion 105 (shoulder surface 104 to junction 106) | 9/16" |

TABLE I-continued

DIMENSIONS OF APPARATUS

| | |
|---|---|
| Length cylindrical portion 103 (surface 104 to end 101) | ½" |
| Diameter cylindrical portion 103 | 1.260" |
| Radial width of surface 104 (from bottom of frusto-conical surface 105 to outer cylindrical surface of portion 103) | 1/32" |
| Material | 4140 SAE |
| Plug assembly 21 | |
| Body 75 diameter | 1.260" ± .005 |
| Length of unit 67 (surface 76 to surface 86) | 1 ⅞" ± .032 |
| Body upper portion (surface 76 to top of groove 74) | ⅞" |
| Body groove 74 length (parallel axis 70) | ¼" |
| Lower body portion (bottom of groove 74 to top of frusto-conical portion 72) | 3/16" |
| Frusto-conical portion 72 length | ⅜" |
| Inter-unit connector (face 76 to bottom of frusto-conical portion 82) | ¼" |
| Material | 1018 SAE |
| Pipe 25 | |
| 1¼" pipe type 80XS, extra strong | |
| Internal diameter | 1.278" |
| Wall thickness | .191" |
| Outside diameter | 1.660" |
| Standard pipe 1¼" size | |
| Internal diameter | 1.38" |
| Outside diameter | 1.660" |
| Wall thickness | 0.14" |

TABLE II

MATERIALS USED

| Steel Type Components | 4140 Weight % | 1018 Weight % |
|---|---|---|
| C | .38–.43 | .15–.20 |
| Mn | .75–1.0 | .6–.9 |
| P | .04 | .04 |
| S | .04 | .05 |
| Si | .20–.35 | |
| Cr | .80–1.10 | |
| Mo. | .15–.25 | |
| Brinell hardness | 240 | 111 |

I claim:

1. Process of disconnecting a service line open and connected to a branch line, the branch line having a passage open to and connected to a main conduit, said main conduit containing gas under pressure, and sealing said branch line, said branch line interior surface being cylindrical in shape and of uniform diameter along its length and connected at its lower portion to said main conduit, said procedure comprising the steps of
    (a) sealing said passage of said branch line with a temporary seal between said service line and said main conduit,
    (b) cutting the branch line between said temporary seal and said service line and forming a new, circular top opening in the remaining lower portion of said branch line beyond said temporary seal, said new opening having the same shape and diameter as the passage in said branch line,
    (c) removing the temporary seal and briefly providing for escape of gas from said main conduit, through said new opening (d) sealing said new opening in said branch line with the narrow end of a closely fitting flaring means therefor, (e) forcing said flaring means into said new top opening of said branch line and selectively expanding said new top opening at its top and the upper portion of said passage in said remaining portion of said branch line to form a flared opening at the top of said remaining lower portion of said branch line while sealing said new and flared opening against upper portion and flared passage of gas therethrough, (f) removing said flaring means from said new and flared opening, (g) inserting into said new and flared opening a rigid solid cylindrical steel sealing element of less diameter than the interior cylindrical surface of said branch line and forming a loose sliding fit therewith, said rigid solid sealing element supporting a resilient sealing element having a cylindrical outline and having a greater diameter than the interior cylindrical surface of said branch line and a lesser diameter than the diameter of said new and flared opening and located below an upper portion of said rigid solid sealing element, (h) moving said upper portion of said rigid sealing element and said resilient sealing element below the top and flared portion of said branch line and thereby forming a gas-tight seal across said branch line by the combination of said resilient sealing element and a portion of said rigid solid sealing element below said resilient sealing element, said resilient sealing element extending laterally from said rigid solid sealing element and firmly holding said rigid solid sealing element in place in said branch line by compression of said resilient seal element between said rigid solid sealing element and the interior surface of said branch line, (i) adding a welding bead near to a junction of the interior surface of said flared portion of said lower portion of said branch line and the said upper portion of said sealing element above said resilient sealing element and (j) welding said flared opening of said branch line lower portion to the upper portion of said rigid solid steel sealing element above said resilient sealing element while selectively heating portions of said rigid solid steel sealing but not the said resilient sealing element to welding temperature, (k) cooling the rigid solid steel sealing element to form a permanent metallic seal free of cracks across the passage in said remaining portion of said branch line, and (l) reducing the diameter of the new and flared opening of the remaining portion of said branch line adjacent said flared opening and thereby compressing said welding bead.

2. Process as in claim 1 wherein said step of reducing the diameter of the new and flared opening of said remaining portion of said branch line and said step of welding said flared opening of said lower portion of said branch line to said upper portion of said rigid solid steel sealing are concurrent.

3. Process as in claim 1 wherein a combustible gas flows through main conduit line concurrent with performance of the steps of claim 1.

4. Process as in claim 2 wherein a combustible gas flows through main conduit line concurrent with performance of the step of claim 2.

5. Apparatus for sealing a steel branch line comprising, in combination, (a) a multiple permanent plug unit assembly comprising a plurality of like permanent plug units firmly joined together in series, each of said plug units being identical and formed of steel with less than 0.25% carbon, each permanent plug unit being an axially symmetrical rigid structure circular in cross-section transverse to a longitudinally extending axis of symmetry, each permanent plug unit having a lower permanent plug unit interunit cylindrical unit portion and, firmly connected thereto and thereabove, a permanent plug unit frusto-conical portion, and thereabove and firmly connected thereto, a cylindrical permanent plug body lower portion which is continuous with an annular plug body groove thereabove and, thereabove, a cylindrical permanent plug body upper portion, the cylindrical upper portion terminating in a permanent plug unit upper shoulder surface, the diameters of said plug body lower and upper portions and being of the same size, each permanent plug shoulder surface being a flat annulus and connected through a permanent plug assembly interunit connector to a like permanent plug unit in said series, and (b) a resilient temporary sealing anchor ring, said anchor ring having an exterior diameter larger than the external diameter of said body of said permanent plug units and a thickness less than the length of said annular plug body grooves measured along the axis of symmetry of said permanent plug units and a width which is greater than the depth of said annular grooves measured perpendicular to said axis of symmetry of said permanent plug units.

6. Apparatus as in claim 5 and comprising also (c) a temporary sealing assembly comprising a rigid vertical tube which is attached to an upper rigid horizontally extending upper compressor plate and a rigid vertical shaft which is threaded at its top and is slidably located within said rigid vertical tube and is firmly attached to a horizontally extending rigid lower compressor plate and an expansible gas-tight plug unit located between said plates and tightening means are attached to said shaft and bear against said tube, said expansible plug unit having a contracted and expanded position, in said expanded position having a diameter larger than the diameter of said plug body portion of said permanent plug unit and in said contracted position having a diameter smaller than the diameter of said plug body portion of said permanent plug unit and, (d) a rigid die unit composed of a tough, hard, high carbon steel cylindrical in section and axially symmetrical about a longitudinal axis of symmetry, said die unit composed of a narrow, flat, circular end face which is continuous with a die unit small end cylindrical portion, which end cylindrical portion is connected by a flat annular surface inwardly directed from the outer surface of the cylindrical portion to a die unit frusto-conical portion, said die unit frusto-conical portion connected by an intermediate frusto-conical cylindrical junction to an intermediate cylindrical body portion, a shoulder portion extending laterally outward from the cylindrical portion and continuous with an upper cylindrical portion which terminates at a die upper end, said die unit frusto-conical portion having a larger end with a diameter greater than the diameter of the diameter of said upper plug body cylindrical portion and a smaller end with a diameter less than the diameter of said upper plug body portion and the surface of said frusto-conical portion forming an angle in the range of 20° to 35° with the longitudinal axis of symmetry of said die.

7. Apparatus as in claim 6 wherein said die unit is made of a hardenable steel with carbon content in excess of 0.25% C.

8. Apparatus as in claim 6 wherein said die unit is formed of SAE 4140 steel.

* * * * *